(12) United States Patent
Ricketts

(10) Patent No.: US 8,978,802 B2
(45) Date of Patent: Mar. 17, 2015

(54) AIR INTAKE CONFIGURATION FOR AN AGRICULTURAL HARVESTING MACHINE

(75) Inventor: Jonathan Eugene Ricketts, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/586,294

(22) Filed: Aug. 15, 2012

(65) Prior Publication Data

US 2014/0048346 A1 Feb. 20, 2014

(51) Int. Cl.
| | |
|---|---|
| *B60K 13/06* | (2006.01) |
| *A01D 41/12* | (2006.01) |
| *F02B 29/04* | (2006.01) |
| *F02M 35/08* | (2006.01) |
| *F02M 35/10* | (2006.01) |
| *F02M 35/16* | (2006.01) |
| *F02M 35/108* | (2006.01) |

(52) U.S. Cl.
CPC ........ *A01D 41/1208* (2013.01); *A01D 41/1252* (2013.01); *F02B 29/0481* (2013.01); *F02M 35/086* (2013.01); *F02M 35/10013* (2013.01); *F02M 35/10124* (2013.01); *F02M 35/108* (2013.01); *F02M 35/164* (2013.01); *Y02T 10/146* (2013.01)
USPC ................. 180/68.3; 180/68.1; 56/1; 460/23; 460/119

(58) Field of Classification Search
CPC .............. A01D 41/00; A01D 41/1208; A01D 41/1252; A01D 41/12; B60K 11/08; B60K 13/02; B60K 13/06; F02M 37/00; F02M 35/161; F02M 35/00; F02M 35/10; F02M 35/04; F02M 35/042; F02M 35/048; F02M 35/10091; F02M 35/164
USPC ........ 180/68.1, 68.3; 454/143, 146, 136, 137; 123/184.21; 56/1, 16.6, 12.8; 460/119, 460/23
See application file for complete search history.

(56) References Cited

U.S. PATENT DOCUMENTS

| | | | | | |
|---|---|---|---|---|---|
| 181,429 | A | * | 8/1876 | Foglesong | 454/107 |
| 412,913 | A | * | 10/1889 | Brown | 454/107 |
| 2,198,792 | A | * | 4/1940 | Schjolin | 180/68.2 |
| 2,232,108 | A | * | 2/1941 | Giacomini | 454/136 |
| 2,429,732 | A | * | 10/1947 | Roos | 123/1 R |
| 2,730,084 | A | | 1/1956 | Stegeman | |
| 2,761,370 | A | * | 9/1956 | Rhoades | 454/127 |

(Continued)

FOREIGN PATENT DOCUMENTS

| | | | | | |
|---|---|---|---|---|---|
| CN | 201687615 | | 12/2010 | | |
| JP | 05146211 | A | * | 6/1993 | A01D 41/12 |
| JP | 05146212 | A | * | 6/1993 | A01D 41/12 |

*Primary Examiner* — J. Allen Shriver, II
*Assistant Examiner* — Steve Clemmons
(74) *Attorney, Agent, or Firm* — Seyed V. Sharifi T.; Patrick M. Sheldrake

(57) ABSTRACT

An agricultural work vehicle includes a vehicle body having longitudinally extending sides. An enclosed engine compartment is configured within the vehicle body. An air inlet is defined in side of the vehicle body for intake of air into the engine compartment. A grain bin forward of the engine compartment includes a grain bin extension skirt mounted above the grain bin. An intake housing is mounted over the air inlet in the vehicle body side and includes a forwardly extending portion mounted alongside the grain bin extension with an inlet opening oriented so as draw air primarily from an area forward of the engine compartment and above the vehicle body.

13 Claims, 2 Drawing Sheets

(56) References Cited

U.S. PATENT DOCUMENTS

| | | | |
|---|---|---|---|
| 2,886,016 A * | 5/1959 | Ashton | 123/41.04 |
| 2,896,594 A * | 7/1959 | Ashton | 123/41.04 |
| 3,226,918 A * | 1/1966 | Stevens | 56/12.8 |
| 3,636,684 A * | 1/1972 | Vogelaar et al. | 56/14.7 |
| 3,657,992 A * | 4/1972 | Minnick, Jr. | 454/136 |
| 3,844,202 A * | 10/1974 | Ferguson | 454/143 |
| 3,847,577 A * | 11/1974 | Hansen | 55/385.3 |
| 3,987,862 A | 10/1976 | Lidstone | |
| 4,078,840 A * | 3/1978 | Itoh | 296/192 |
| 4,086,976 A * | 5/1978 | Holm et al. | 180/68.1 |
| 4,140,047 A * | 2/1979 | Bowman et al. | 454/138 |
| 4,157,902 A * | 6/1979 | Tokar | 55/385.3 |
| 4,514,201 A | 4/1985 | Brown | |
| 4,874,411 A | 10/1989 | Snauwaert et al. | |
| 4,909,134 A * | 3/1990 | Sauber | 454/143 |
| 4,934,449 A * | 6/1990 | Watt et al. | 165/41 |
| 5,358,442 A * | 10/1994 | Ekinci | 454/158 |
| 5,944,603 A * | 8/1999 | Guinn et al. | 460/100 |
| 6,062,975 A * | 5/2000 | Knudtson | 454/138 |
| 6,248,145 B1 * | 6/2001 | Radke | 55/295 |
| 6,431,299 B1 * | 8/2002 | Asche et al. | 180/68.1 |
| 6,745,860 B2 * | 6/2004 | Yabe | 180/68.1 |
| 6,761,748 B2 * | 7/2004 | Schenk et al. | 55/385.3 |
| 7,182,164 B2 * | 2/2007 | Merlo | 180/68.1 |
| 7,370,575 B2 | 5/2008 | Kraus et al. | |
| 7,507,270 B2 | 3/2009 | Maas et al. | |
| 2005/0215191 A1 * | 9/2005 | Kino | 454/143 |
| 2010/0012413 A1 | 1/2010 | Chaney et al. | |
| 2012/0267180 A1 * | 10/2012 | Wang et al. | 180/68.1 |

\* cited by examiner

AIR INTAKE CONFIGURATION FOR AN AGRICULTURAL HARVESTING MACHINE

FIELD OF THE INVENTION

The present invention generally relates to agricultural harvesting machines, such as a combine, and more particularly to a cooling and engine air intake system for such vehicles.

BACKGROUND OF THE INVENTION

Agricultural work vehicles, such as a harvester combine, are typically powered by an internal combustion engine located in an engine compartment, which isolates the engine from the relatively dirty work environment. The internal combustion engine requires a relatively clean source of engine combustion air and cooling air that must be drawn from ambient air around the vehicle. The harvesting process, however, generates a significant amount of airborne particulates, including dust, dirt, and the like. MOG (material other than grain) is separated from the harvested grain and is typically blown out from the processing equipment and spread on the ground behind the vehicle as chaff. This process of spreading chaff is possibly the major contributor to the relatively dirty ambient air around the vehicle. With the unavoidable amount of airborne matter in the ambient air, it can be difficult to draw and supply the clean air needed by the engine.

Conventional combines draw ambient air from generally along the side of the vehicle with an engine fan. The air is drawn through a rotary air screen that provides an initial degree of cleaning. A vacuum system may be configured with the rotary screen to vacuum particulate matter from the screen as it rotates. A portion of the air drawn through the rotary screen is directed through heat exchangers (e.g., radiator, charge air cooler, hydraulic system cooler, and so forth), while another portion is further cleansed in an engine air filter and directed to the engine intake manifold for combustion air. Because the air is initially drawn from perhaps the dirtiest air around the vehicle, the rotary screen and engine air filter require frequent cleaning and maintenance.

U.S. Pat. No. 7,507,270 proposes an arrangement wherein an air scoop is placed around the rotary screen. The air scoop has an upwardly facing inlet above the combine body and engine housing to draw relatively cleaner air through the rotary screen as compared to the air drawn from alongside the vehicle.

Accordingly, what is sought in the industry is an improved air intake configuration that will initially supply relatively cleaner air for engine combustion and component cooling as compared to conventional designs.

BRIEF DESCRIPTION OF THE INVENTION

Aspects and advantages of the invention will be set forth in part in the following description, or may be obvious from the description, or may be learned through practice of the invention.

In general, aspects of the present invention relate to a work vehicle, particularly agricultural work vehicles such as a harvester combine. It should be appreciated, however, that the invention is not limited to a combine, or any other particular type of work vehicle, and that the invention has usefulness for any vehicle wherein it is beneficial to provide a relatively clean source of engine compression and cooling air. Aspects of the invention are described herein with reference to a combine for illustrative purposes only.

In certain embodiments, the agricultural work vehicle includes a vehicle body having longitudinally extending sides, with an enclosed engine compartment configured within the vehicle body. An air inlet is defined in a respective one the vehicle body sides for intake of air into the engine compartment. A rotary screen and associated vacuum device may be mounted over the air inlet. The work vehicle includes a grain bin forward of the engine compartment, and a grain bin extension skirt mounted on the vehicle body above the grain bin so as to extend upwardly above the vehicle body. An air intake housing is mounted over the air inlet in the vehicle body side and includes a forwardly extending portion mounted alongside the grain bin extension with an inlet opening oriented so as to draw air primarily from an area forward of the engine compartment and above the vehicle body. The intake housing has an outlet in communication with the air inlet in the vehicle body. The area forward of the engine compartment and above the vehicle body is, for many types of agricultural work vehicles, relatively cleaner than the dirtier ambient air that surrounds the work vehicle. The intake housing configuration of the present invention takes advantage of this source of relatively cleaner air.

The shape of the intake housing may vary widely within the scope and spirit of the invention. For example, the housing may, in certain embodiments, have a generally rounded cross-sectional shape, such as a semi-spherical or semi-cylindrical shape, and is mounted over the air inlet with the forwardly extending portion configured so as to extend upwardly and forwardly alongside the grain bin extension. The forwardly extending portion may have a forward edge, with the inlet opening defined in the forward edge so as to draw air primarily from alongside of the grain bin extension. In an alternate embodiment, the forwardly extending portion may include an upper edge, with the inlet opening defined in the upper edge so as to draw air primarily from above the grain bin extension. The forwardly extending portion may include inlet openings in both of the upper and forward edges in still another embodiment.

In a particular embodiment, the forwardly extending portion of the intake housing is an enclosed box-like structure mounted alongside the grain bin extension. In an alternate embodiment, the structure may be a shell or panel-member that is fixed to the grain bin extension such that the side of the grain bin extension defines a portion of the intake housing.

In one embodiment, the forwardly extending portion of the intake housing extends along a single side of the grain bin extension. In an alternate embodiment, the forwardly extending portion of the intake housing extends along each side of the grain bin extension.

In still a further embodiment, the grain bin extension has a double-wall construction with an inner wall and an outer wall around at least a portion of the bin. The intake housing is defined by at least a portion of this double wall construction, wherein an inlet opening is defined in the said outer wall such that air is drawn into a space between said inner and out walls and directed into the air inlet. Thus, in this embodiment, the wall construction of the grain bin extension defines a portion of the intake housing. With this embodiment, a plurality of inlet openings may be spaced around the sides and/or top edge of the bin extension. A central duct may be configured in communication with the space between the inner and outer wall to convey intake air to a portion of the intake housing covering the inlet opening.

The present invention also encompasses various method embodiments for supplying engine combustion and cooling air to an internal combustion engine of a work vehicle (e.g., an agricultural work vehicle such as a combine harvester)

wherein the engine is housed in an engine compartment rearward of a grain bin and grain bin extension, and wherein an air inlet is provided in the vehicle body for intake of air into the engine compartment. The method includes configuring an intake housing over the air inlet and drawing air into the intake housing from an area forward of the engine compartment and above the vehicle body.

In a particular method embodiment, the air is drawn into the intake housing from an area alongside one or both sides of the grain bin extension.

In another embodiment, the air is drawn into the intake housing primarily from an area above one or both sides of the grain bin extension.

In still another embodiment, the grain bin extension includes a double-wall construction, wherein the method includes drawing engine air is into a space between an inner and outer wall of the double-wall construction around at least a portion of the grain bin extension and into the air inlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 is a perspective view of an engine compartment incorporating an embodiment of an air intake system in accordance with aspects of the invention;

FIG. 4 is a perspective view of an engine compartment incorporating another embodiment of an air intake system in accordance with aspects of the invention;

FIG. 5 is a perspective view of an engine compartment incorporating still a different embodiment of an air intake system in accordance with aspects of the invention;

FIG. 6 is a top view of an embodiment of an air intake system configured around a portion of a grain bin extension; and FIG. 7 is a top view of an embodiment of an air intake system configured along a side of a grain bin extension.

DETAILED DESCRIPTION OF THE INVENTION

Figure 1:
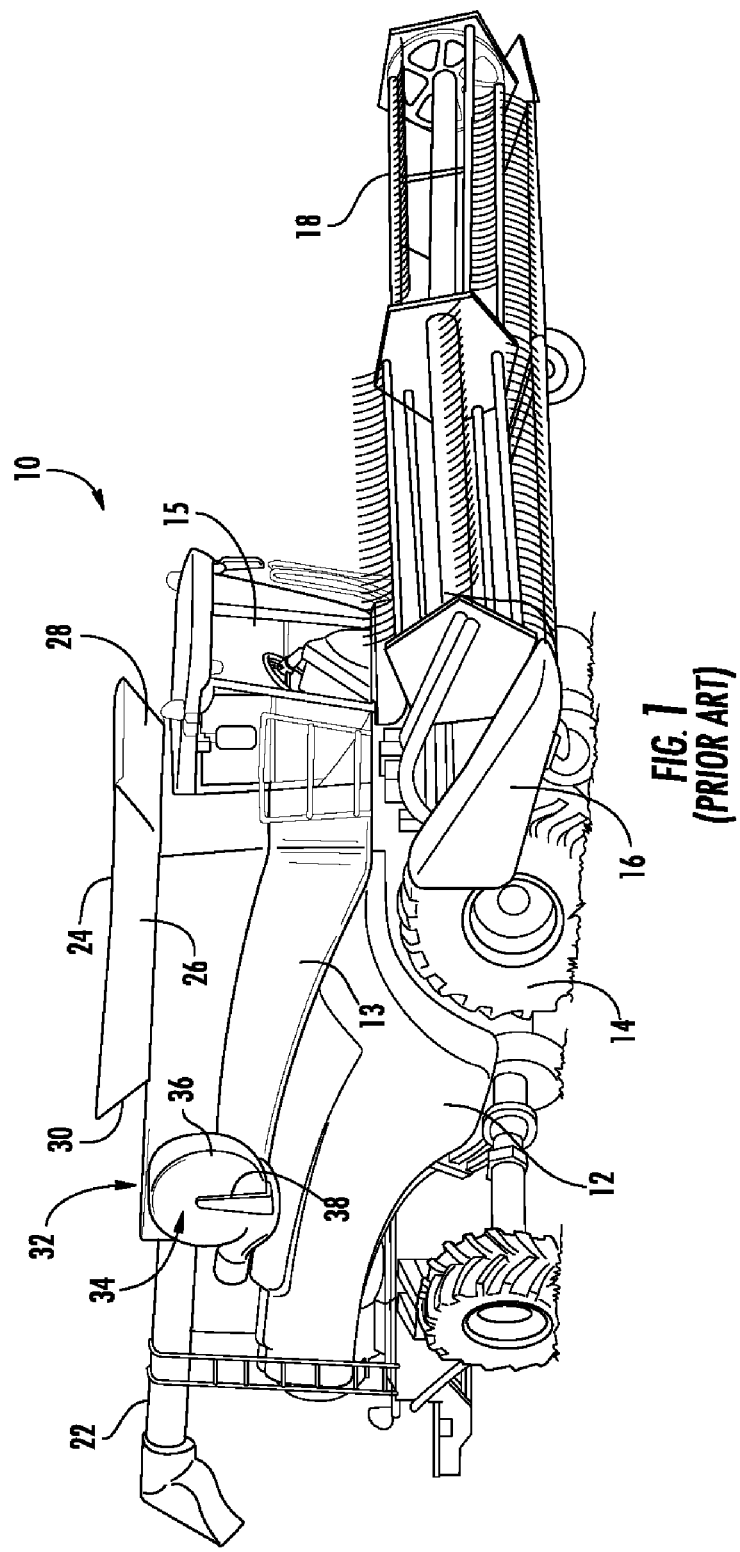
FIG. 1 is a perspective view of a conventional combine harvester.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, wherein like numbers refer to generally like items or features, FIG. 1 depicts an agricultural work vehicle 10 as a conventional combine harvester for illustrative purposes only. The work vehicle 10 has a body 12 with sides 13 mounted on a frame (not visible). The body 12 and frame are supported on wheels 14 or other transport means, such as tracks. An operator's cab 15 is at the front of the vehicle 10. A feeder house 16 is configured on a front end of the combine 10 with a header 18 that serves to sever a swath of crops from a field as the combine 10 moves forward and to convey the severed crops to feeder house 14. The feeder house 16 includes an internal conveying system (not shown), for conveying the crops upwardly and rearwardly into the body of the combine 10 and into an inlet of an internal separating or threshing system for processing. The threshing system generally includes a rotor at least partially enclosed in a concave structure in which the crop material is processed for separating grain and material other than grain (MOG) from straw, with the straw being ejected rearwardly from the threshing system through the rear end of the combine 10 for deposit on the field, as is well-known. The harvested crop material is conveyed to a grain bin 20 for subsequent unloading via an unload auger 22. An upwardly extending grain bin extension skirt 24 is configured above the grain bin 20 and includes a front wall 28, longitudinally extending side walls 26 and a rear wall 30. The grain bin extension 24 extends above the vehicle sides 13 and cab 15, and may have outwardly sloped walls that define a generally trapezoidal shape.

Referring to various figures in general, the combine 10 includes an internal combustion engine housed within engine compartment 32 in the rear portion of the combine 10. The engine compartment 32 may be variously configured. In the illustrated embodiment, the compartment 32 is defined by a housing structure having panels mounted to the vehicle frame. In an alternate embodiment, the engine compartment 32 may be manufactured with the engine and mounted as an integral unit in the vehicle 10.

Internal combustion engines are well known and need not be described in detail herein. Briefly, the engine includes combustion cylinders operably configured between an intake manifold and an exhaust manifold. The intake manifold receives combustion air via a duct in communication with an air inlet 34 (FIG. 1) in the body 12, for example in the body side 13. A turbocharger system may be utilized for providing compressed charge air to combustion cylinders. Exhaust gas is discharged from the cylinders to a muffler via an exhaust manifold.

In a typical configuration, a fan within the engine compartment 32 draws cooling ambient air through a radiator and charge air cooler. The radiator cools the liquid coolant circulated within the engine, and the charge air cooler cools the compressed and heated air which is discharged from the turbocharger. A rotary screen 36 may be configured in the vehicle side 13 over the inlet 34 at the upstream side of the radiator. This screen 36 rotates during operation of the combine 10 to remove airborne particulates (e.g., chaff, straw, and the like) from the ambient air drawn through the radiator. A vacuum device 38 may be used to vacuum the particulate matter from the outer surface of rotary screen 36 as the screen rotates past the vacuum.

Figure 2:
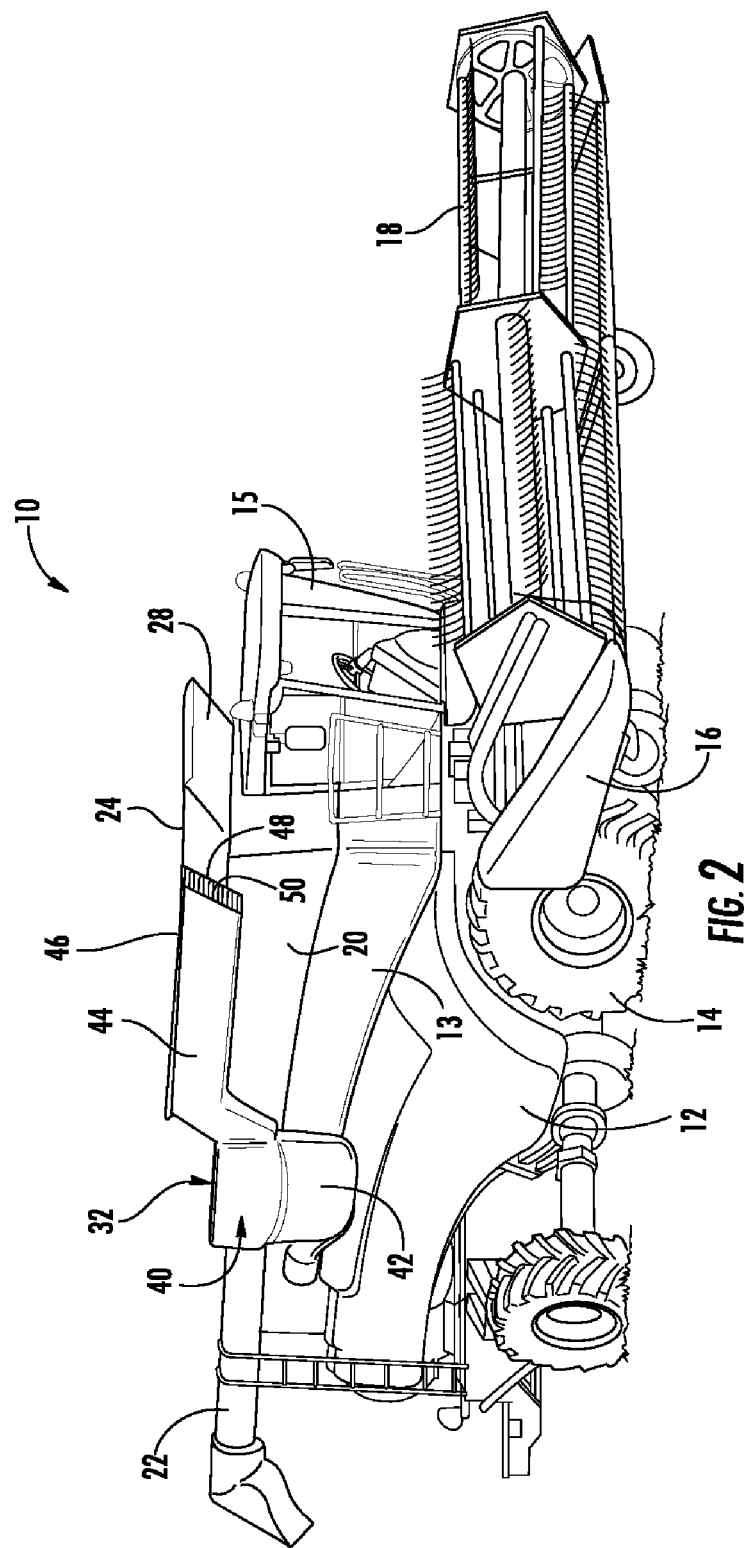
FIG. 2 is a perspective view of a combine harvester incorporating aspects of the present invention.

FIGS. 2 and 3 illustrate an embodiment of the vehicle 10 wherein an air intake housing 40 is configured over the air inlet 34 in the vehicle body 12. In particular, the housing 40 has a rearward portion 42 with an overall shape and depth so as to be mounted to the vehicle side 13 over the rotary screen 36 and vacuum device 38. In this regard, it should be appreciated that the intake housing 40 may have various shapes, and that the generally rectangular shell shape depicted in the figures is for illustrative purposes only. The rearward portion 42 of the housing 40 may, in other embodiments, have a semi-spherical shape, cylindrical or oval shape, or any other suitable shape. The intake housing 40 may be defined by separate components that are attached together to define the housing 40, or may be a single panel member that is formed by any suitable molding or forming process into the overall desired shape of the intake housing 40.

Still referring to the embodiment of FIGS. 2 and 3, the forwardly extending portion 44 of the intake housing 40 extends at least partially alongside the grain bin extension 24, for example along at least a portion of one of the sides 26 of the grain bin extension 24. This portion 44 of the intake housing has any combination of air inlet openings 50 along a top edge 46 and/or forward edge 48 of the extending portion 44 for drawing engine intake air into housing 40. The housing 40 includes an outlet 51 in the rearward portion 42 positioned generally adjacent to the rotary screen 36 and vacuum 38 such that air drawn into the housing 40 is then drawn through the rotary screen 36 and through the engine compartment components discussed above. The outlet 51 may be defined by the completely open back side of the rearward portion 42, or by any other manner of baffle, duct, or other structure.

Still referring FIGS. 2 and 3, it should be thus appreciated that the orientation and position of the forwardly extending portion 44 of the intake housing 40 results in the substantial portion of the engine intake air being drawn from the relatively protected area forward of the engine compartment 32 and above the vehicle body 12, as indicated by the air flow path lines in FIG. 3. This flow path is dictated by the shape and configuration of the intake housing 40, and may include any manner of internal structure or baffle to direct the air flow as desired from the inlet opening 50 to the outlet 51.

Referring to FIG. 3, the forwardly extending portion 44 of the air intake housing 40 is an essentially box-like structure having back and front sides, a top edge 46, and a forward edge 48, with the air inlet opening defined essentially along the entirety of the forward edge 48. This box-like structure is mounted alongside the longitudinal side 26 of the grain bin extension 24. With this embodiment, the intake air is drawn primarily from the area alongside of the grain bin extension 24, as compared to the area above the grain bin extension 24.

The embodiment depicted in FIG. 4 is similar to the embodiment of FIG. 3 with the exception that the air inlet opening 50 is defined in the top edge 46 of the forwardly extending portion 44. Thus, in the embodiment, the air is drawn primarily from the area above the grain bin extension 24, as depicted by the flow arrows in FIG. 4.

Although not depicted in FIGS. 3 and 4, it should be readily appreciated that any configuration of inlet openings 50 may be defined in any of the surfaces of the forwardly extending portion 44. For example, air inlet openings 50 may be provided in the top edge 46 and the forward edge 48, as well as in the outwardly facing side wall 47.

It should be further appreciated that the inlet openings 50 may be covered by any manner of filter, screening device, or vent 68, as depicted in FIGS. 6 and 7.

In the embodiment of FIGS. 3, 4, and 6, the forwardly extending portion 44 of the air intake housing 40 is configured along a single one of the longitudinal sides 26 of the grain bin extension 24. It should be appreciated that this is not a requirement and that the forwardly extending portion 44 may be configured around any portion of the grain bin extension 24. For example, FIG. 6 depicts an embodiment wherein the forwardly extending portion 44 extends around a portion of both longitudinal sides 26 and the back side 30 of the grain bin extension 24. A duct 66 connects the forwardly extending portion 44 to the rearward portion 42. Opposite inlets with vents 68 are provided along the top edge 46 at opposite sides of the grain bin extension 24.

Referring to FIGS. 6 and 7, it should be appreciated that the forwardly extending portion 44 of the air intake housing 40 may be defined by a shell member 54 as opposed to a box-like structure of FIGS. 3 and 4. In this embodiment, the shell member 54 has a completely open back and is mounted directly onto the grain bin extension 24 such that the sides of the grain bin extension 24 define sides of the forwardly extending portion 44. In other words, the grain bin extension 24 would define an inner wall of the housing 40 while the shell member 54 defines the outer wall.

FIG. 5 depicts an embodiment wherein the forwardly extending portion 44 of the air intake housing is defined by a double-wall construction 56 of the grain bin extension 24. This double-wall construction 56 includes an inner wall 58 and an outer wall 60, with an air flow space 62 defined between the respective walls. This double-wall construction 56 may completely surround the grain bin extension 24 or, in alternate embodiments, may encompass only a portion of the overall circumference of the grain bin extension 24. Any number or configuration of inlet openings 50 may be defined in the outer wall 60. For example, in the embodiment of FIG. 5, the inlet openings 50 are covered by vents 68 and are defined in the upper edge 64 of the double-wall construction 56. A central duct 66 is configured on the back side 30 of the grain bin extension and connects the air flow space 62 between the double walls to the rearward portion 42 of the intake housing 40. It should be appreciated that this duct 66 may be in communication at any position along the double-wall construction 56.

It should be appreciated that the present invention also encompasses various method embodiments for supplying engine combustion and cooling air to an internal combustion engine of a work vehicle 10 wherein the engine is housed in an engine compartment 32 rearward of a grain bin 20 and grain bin extension 24. The method includes configuring an intake housing 40 over an air inlet into the engine compartment and drawing air into the intake housing from an area forward of the engine compartment 32 and above the vehicle body 12, as discussed above. In a particular method embodiment, the engine air is drawn into the intake housing 40 primarily from an area along one or both of the longitudinally extending sides 26 of the grain bin extension 24.

In an alternate method embodiment, the engine air is drawn into the intake housing 40 primarily from an area above one or both sides 26 of the grain bin extension. In still a further method embodiment, the grain bin extension includes a double-wall construction around at least a portion of the perimeter thereof, wherein the method includes drawing the engine air into a space between the inner and outer walls of the double wall construction and directing the air into the inlet of the engine compartment 32.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural work vehicle, comprising:
a vehicle body having longitudinally extending sides;
an enclosed engine compartment within said vehicle body;
an air inlet in a respective one said vehicle body sides for intake of air into said engine compartment;
a grain bin forward of said engine compartment, and a grain bin extension skirt mounted on said vehicle body above said grain bin; and
an air intake housing in form of a shell member that defines an outer wall mountable as a separate member directly over said air inlet in said vehicle body side; an inner wall of the air intake housing is defined by a wall construction of the grain bin extension, said intake housing further comprising a forwardly extending portion mounted alongside said grain bin extension with an inlet opening oriented so as draw air primarily from an area forward of said engine compartment and above said vehicle body, said intake housing having an outlet in communication with said air inlet in said vehicle body.

2. The agricultural work vehicle as in claim 1, wherein said forwardly extending portion comprises a forward edge, said inlet opening defined in said forward edge so as to draw air primarily from alongside of said grain bin extension.

3. The agricultural work vehicle as in claim 1, wherein said forwardly extending portion comprises an upper edge, said inlet opening defined in said upper edge so as to draw air primarily from above said grain bin extension.

4. The agricultural work vehicle as in claim 1, wherein said forwardly extending portion of said intake housing comprises a box-like structure mounted alongside said grain bin extension.

5. The agricultural work vehicle as in claim 1, wherein said forwardly extending portion of said intake housing extends along at least a portion of a single side of said grain bin extension.

6. The agricultural work vehicle as in claim 1, wherein said forwardly extending portion of said intake housing extends along at least a portion of each side of said grain bin extension.

7. The agricultural work vehicle as in claim 1, wherein said grain bin extension comprises a double-wall construction with an inner wall and an outer wall, said intake housing defined by at least a portion of said double wall construction, said inlet opening defined in said outer wall such that air is drawn into a space between said inner and out walls and directed into said air inlet.

8. The agricultural work vehicle as in claim 7, comprising a plurality of said inlet opening spaced around said grain bin extension.

9. The agricultural work vehicle as in claim 7, further comprising a duct in communication with said space through said outer wall, said duct conveying intake air to a portion of said intake housing covering said inlet opening.

10. A method of supplying engine combustion and cooling air to an internal combustion engine of a work vehicle wherein the engine is housed in an engine compartment rearward of a grain bin and grain bin extension, and wherein an air inlet is provided in the vehicle body for intake of air into the engine compartment, the method comprising;
configuring an intake housing via a shell member that defines an outer wall for a housing of the air inlet the shell mountable as a separate member on the grain bin extension, such that a wall construction of the grain bin extension defines a portion of the housing of the air inlet; and
drawing air into the housing from an area forward of the engine compartment and above the vehicle body.

11. The method as in claim 10, comprising drawing air into the intake housing primarily from an area alongside one or both sides of the grain bin extension.

12. The method as in claim 11, comprising drawing air into the intake housing primarily from an area above one or both sides of the grain bin extension.

13. The method as in claim 11, wherein the grain bin extension comprises a double-wall construction, wherein the engine air is drawn into a space between an inner and outer wall of the double-wall construction around at least a portion of the grain bin extension and into the air inlet.

* * * * *